US008913951B2

(12) United States Patent
Rofougaran et al.

(10) Patent No.: US 8,913,951 B2
(45) Date of Patent: *Dec. 16, 2014

(54) METHOD AND SYSTEM FOR 60 GHZ DISTRIBUTED COMMUNICATION UTILIZING A MESH NETWORK OF REPEATERS

(75) Inventors: Ahmadreza Rofougaran, Newport Coast, CA (US); Maryam Rofougaran, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 802 days.

This patent is subject to a terminal disclaimer.

(21) Appl. No.: 12/895,547

(22) Filed: Sep. 30, 2010

(65) Prior Publication Data
US 2011/0045767 A1 Feb. 24, 2011

Related U.S. Application Data

(63) Continuation-in-part of application No. 11/865,004, filed on Sep. 30, 2007.

(51) Int. Cl.
*H04B 1/74* (2006.01)
*H04B 1/00* (2006.01)
*H04B 17/00* (2006.01)
*H04B 7/26* (2006.01)

(52) U.S. Cl.
CPC .................................. *H04B 7/2606* (2013.01)
USPC .......................................................... 455/15

(58) Field of Classification Search
CPC ......... H04B 17/0045; H04B 1/18; H04J 1/00; H04J 3/00; G01S 13/24
See application file for complete search history.

(56) References Cited

U.S. PATENT DOCUMENTS

| 5,379,455 | A | 1/1995 | Koschek |
| 6,070,063 | A | 5/2000 | Yoshizawa et al. |
| 6,359,897 | B1* | 3/2002 | Hessel et al. ................... 370/429 |
| 6,405,018 | B1* | 6/2002 | Reudink et al. .................. 455/20 |
| 6,539,052 | B1* | 3/2003 | Hessel et al. ................... 375/225 |
| 6,807,237 | B1* | 10/2004 | Yamaguchi et al. ........... 375/328 |
| 7,321,316 | B2* | 1/2008 | Hancock et al. ......... 340/870.02 |
| 7,460,082 | B2 | 12/2008 | Li et al. |
| 2001/0046840 | A1 | 11/2001 | Kim |
| 2002/0012336 | A1* | 1/2002 | Hughes et al. ................. 370/347 |
| 2003/0031279 | A1* | 2/2003 | Blount et al. .................. 375/346 |
| 2003/0045284 | A1 | 3/2003 | Copley et al. |
| 2004/0051598 | A1 | 3/2004 | Vann et al. |
| 2004/0120708 | A1* | 6/2004 | Hirt et al. ......................... 398/26 |
| 2005/0130588 | A1* | 6/2005 | Pratt et al. ..................... 455/11.1 |

(Continued)

*Primary Examiner* — Bobbak Safaipour
(74) *Attorney, Agent, or Firm* — Oblon, Spivak, McClelland, Maier & Neustadt, L.L.P.

(57) ABSTRACT

Methods and systems for 60 GHz distributed communication utilizing a mesh network of repeaters are disclosed and may include configuring antennas in remote RF modules in a wireless communication device, wherein each of the RF modules receive IF signals via coaxial lines. The RF signals may be transmitted via the antennas to a destination device via a mesh network that comprises the RF modules and one or more external repeaters. The IF signals in the coaxial lines may be tapped at the RF modules. The repeaters may be configured via a processor in the wireless communication device, where the control signals may be communicated to the RF modules via the coaxial lines. The RF modules may be configured utilizing a processor in the wireless communication device, where the control signals may be communicated via the coaxial lines. The RF signals may be generated from IF signals from baseband signals.

20 Claims, 6 Drawing Sheets

(56) References Cited

U.S. PATENT DOCUMENTS

| | | |
|---|---|---|
| 2007/0218845 A1 | 9/2007 | Efland et al. |
| 2008/0267142 A1* | 10/2008 | Mushkin et al. .............. 370/338 |
| 2010/0041341 A1* | 2/2010 | Stratford .................... 455/67.14 |
| 2010/0202557 A1* | 8/2010 | Harris ........................... 375/295 |
| 2011/0237182 A1* | 9/2011 | Stratford et al. .................. 455/7 |
| 2011/0298672 A1* | 12/2011 | Otto et al. ..................... 343/703 |
| 2012/0082069 A1* | 4/2012 | Rofougaran et al. ......... 370/280 |
| 2012/0083207 A1* | 4/2012 | Rofougaran et al. ........ 455/41.2 |
| 2012/0083225 A1* | 4/2012 | Rofougaran et al. ........... 455/88 |
| 2012/0083233 A1* | 4/2012 | Rofougaran et al. ......... 455/269 |
| 2012/0083306 A1* | 4/2012 | Rofougaran et al. ......... 455/509 |
| 2012/0091799 A1* | 4/2012 | Rofougaran et al. ........... 307/24 |
| 2012/0155514 A1* | 6/2012 | Fruh ............................. 375/219 |
| 2012/0309325 A1* | 12/2012 | Carbone et al. ................ 455/73 |

* cited by examiner

METHOD AND SYSTEM FOR 60 GHZ DISTRIBUTED COMMUNICATION UTILIZING A MESH NETWORK OF REPEATERS

CROSS-REFERENCE TO RELATED APPLICATIONS/INCORPORATION BY REFERENCE

This application is a continuation in part of application Ser. No. 11/865,004 filed on Sep. 30, 2007.

This application makes reference to:
U.S. patent application Ser. No. 12/895,503 filed on Sep. 30, 2010;
U.S. patent application Ser. No. 12/895,514 filed on Sep. 30, 2010;
U.S. patent application Ser. No. 12/895,520 filed on Sep. 30, 2010;
U.S. patent application Ser. No. 12/895,528 filed on Sep. 30, 2010;
U.S. patent application Ser. No. 12/895,537 filed on Sep. 30, 2010; and
U.S. patent application Ser. No. 12/895,573 filed on Sep. 30, 2010.

Each of the above stated applications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to wireless communication. More specifically, certain embodiments of the invention relate to a method and system for 60 GHz distributed communication utilizing a mesh network of repeaters.

BACKGROUND OF THE INVENTION

In 2001, the Federal Communications Commission (FCC) designated a large contiguous block of 7 GHz bandwidth for communications in the 57 GHz to 64 GHz spectrum. This frequency band may be used by the spectrum users on an unlicensed basis, that is, the spectrum is accessible to anyone, subject to certain basic, technical restrictions such as maximum transmission power and certain coexistence requirements. The communications taking place in this band are often referred to as '60 GHz communications'. With respect to the accessibility of this part of the spectrum, 60 GHz communications may be somewhat similar to other forms of unlicensed spectrum use, for example Wireless LANs or Bluetooth in the 2.4 GHz ISM bands. However, communications at 60 GHz may be significantly different in aspects other than accessibility. For example, 60 GHz signals may possess markedly different communications channel and propagation characteristics, at least due to the fact that 60 GHz radiation is partly absorbed by oxygen in the air, thereby leading to higher attenuation with distance. On the other hand, since a very large bandwidth of 7 GHz is available, very high data rates may be achieved. Among the applications for 60 GHz communications are wireless personal area networks, wireless high-definition television signal, for example from a set top box to a display, or Point-to-Point links.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for 60 GHz distributed communication utilizing a mesh network of repeaters, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Figure 1A:
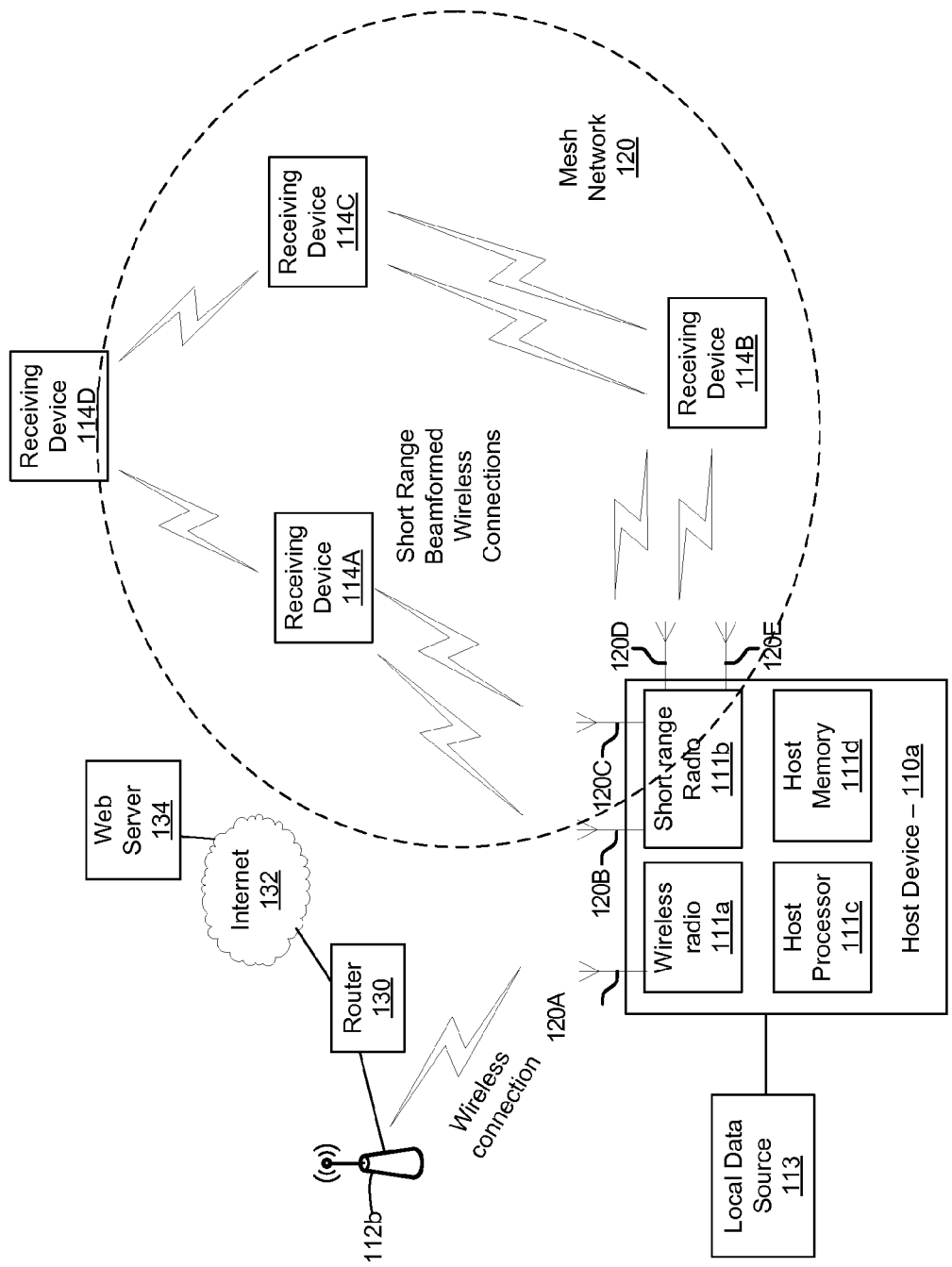
FIG. 1A is a diagram illustrating an exemplary wireless communication system, in accordance with an embodiment of the invention.

Certain aspects of the invention may be found in a method and system for 60 GHz distributed communication utilizing a mesh network of repeaters. Exemplary aspects of the invention may comprise configuring a plurality of antennas in the plurality of remote RF modules for communicating RF signals, wherein each of the plurality of remote RF modules receive IF signals via one or more coaxial lines. The RF signals may be transmitted via the plurality of antennas to a destination device via a mesh network, wherein the mesh network comprises the plurality of remote RF modules and one or more repeaters external to the wireless communication device. The IF signals in the one or more coaxial lines may be tapped at taps coupled to the plurality of remote RF modules. The repeaters in the mesh network may be configured via the wireless communication device. The plurality of remote RF modules may be configured utilizing a processor in the wireless communication device, where the control signals for the configuring of the plurality of remote RF modules may be communicated via the one or more coaxial lines. The mesh network may be configured utilizing a processor in the wireless communication device. The control signals for the configuring of the mesh network may be communicated to one or more of the plurality of RF modules via the one or more coaxial lines. The RF signals may be generated from IF signals from one or more baseband signals that may comprise one or more of video data, streamed Internet data, or data from a local data source. The RF signals may comprise 60 GHz signals.

FIG. 1 is a diagram illustrating an exemplary wireless communication system, in accordance with an embodiment of the invention. Referring to FIG. 1, there is shown an access point 112b, a host device 110a, a local data source 113, receiving devices 114A-114D, a router 130, the Internet 132 and a web server 134. The host device 110a, or computer, for example, may comprise a wireless radio 111a, a short-range radio 111b, a host processor 111c, a plurality of antennas 120A-120E, and a host memory 111d. There is also shown a wireless connection between the wireless radio 111a and the access point 112b, and a mesh network 120 between the short-range radio 111b and the receiving devices 114A-114D.

The host device 110a may comprise a computer or set-top box device, for example, that may be operable to receive signals from data sources, process the received data, and communicate the processed data to receiving devices. Accordingly, the host device 110a may comprise processors, such as the host processor 111c, storage devices such as the host memory 111d, and communication devices, such as the wireless radio 111a and the short range radio 111b.

The wireless radio 111a may comprise suitable circuitry, logic, interfaces, and/or code that may be operable to communicate wireless signals to between the host device 110a and external devices, such as the access point 112b, for example. Accordingly, the wireless radio 111a may comprise amplifiers, mixers, analog-to-digital and digital-to-analog converters, phase-locked loops, and clock sources, for example, that enable the communication of wireless signals.

The short-range radio 111b may comprise suitable circuitry, logic, interfaces, and/or code that may be operable to communicate wireless signals over short distances. Accordingly, the frequency of transmission/reception may be in the 60 GHz range, which may enable short-range communications due to the attenuation of signals in air at this frequency. Similarly, the short-range radio 111b may comprise amplifiers, mixers, analog-to-digital and digital-to-analog converters, phase-locked loops, and clock sources, for example, that enable the communication of wireless signals.

The host processor 111c may comprise suitable circuitry, logic, interfaces, and/or code that may be operable to received control and/or data information, which may comprise programmable parameters, to determine an operating mode of the wireless radio 111a and the short-range radio 111b. For example, the host processor 111c may be utilized to select a specific frequency for a local oscillator, a specific gain for a variable gain amplifier, configure the local oscillator and/or configure the variable gain amplifier for operation in accordance with various embodiments of the invention. Moreover, the specific frequency selected and/or parameters needed to calculate the specific frequency, and/or the specific gain value and/or the parameters, which may be utilized to calculate the specific gain, may be stored in the host memory 111d via the host processor 111c, for example. The information stored in host memory 111d may be transferred to the wireless radio 111a and/or the short-range radio 111b from the host memory 111d via the host processor 111c.

The host memory 111d may comprise suitable circuitry, logic, interfaces, and/or code that may be enabled to store a plurality of control and/or data information, including parameters needed to calculate frequencies and/or gain, and/or the frequency value and/or gain value. The host memory 111d may store at least a portion of the programmable parameters that may be manipulated by the host processor 111c.

The access point 112b may comprise suitable circuitry, logic, interfaces, and/or code that may be enabled to provide wireless signals to one or more devices within its range. The access point 112b may be coupled to the router 130, thereby enabling connection to the Internet for devices that are operable to communicate with the access point 112b.

The local data source 113 may comprise suitable circuitry, logic, interfaces, and/or code that may be enabled to communicate data to the host device 110a. For example, the local data source may comprise a DVD player, and MP3 player, and/or a set-top box.

The receiving devices 114A may comprise suitable circuitry, logic, interfaces, and/or code that may be enabled to receive data communicated by the host device 110a via the short-range radio 111b and communicate the signal or signals to a next device if desired. In an exemplary embodiment of the invention, the receiving device 114D may comprise an HDTV that may be operable to display HD video signals and playback associated audio signals. The receiving devices 114A-114D may comprise a plurality of antennas for communicating RF signals.

The antennas 120A-120E may comprise suitable circuitry, logic, interfaces, and/or code that may be operable to transmit and/or receive wireless signals. For example, the antenna 120A may be operable to transmit and receive wireless signals between the access point 112b and the wireless radio 111a, and the antennas 120B-120E may be operable to communicate signals between the short range radio 111b and one or more external devices, such as the receiving devices 114A. The antennas 120A-120E may be individually enabled for beamforming capability.

The router 130 may comprise suitable circuitry, logic, interfaces, and/or code that may be enabled to communicate signals between the access point 112b and the Internet. In this manner, devices within range of the access point 112b may be enabled to connect to the Internet.

The web server 134 may comprise a remote server that may be operable to store content that may be accessed by the host device 110a via the Internet 132. For example, the web server 134 may comprise a movie provider server and may be operable to communicate a desired movie to the host device 110a via the Internet for display via the receiving device 114A.

Frequently, computing and communication devices may comprise hardware and software to communicate using multiple wireless communication standards. The wireless radio 111a may be compliant with a mobile communications standard, for example. There may be instances when the wireless radio 111a and the short-range radio 111b may be active concurrently. For example, it may be desirable for a user of the computer or host device 110a to access the Internet 132 in order to consume streaming content from the Web server 134. Accordingly, the user may establish a wireless connection between the host device 110a and the access point 112b. Once this connection is established, the streaming content from the Web server 134 may be received via the router 130, the access point 112b, and the wireless connection, and consumed by the computer or host device 110a.

It may be further desirable for the user of the host device 110a to communicate the streaming content to the receiving device 114D, which may comprise a TV or other type of display, for example. However, in instances where the receiving device 114D is outside the range of the short range radio 111b, due to the 60 GHz frequency, for example, the mesh network 120 may be utilized to communicate the desired signals to the receiving device 114D. Accordingly, the user of the host device 110a may establish a mesh network of repeaters comprising the receiving devices 114A-114C.

Once the mesh network 120 is established, and with suitable configurations on the computer enabled, the streaming content may be displayed by the receiving device 114A. In instances where such advanced communication systems are integrated or located within the host device 110a, the radio frequency (RF) generation may support fast-switching to enable support of multiple communication standards and/or advanced wideband systems like, for example, Ultrawideband (UWB) radio. Other applications of short-range communications may be wireless High-Definition TV (W-HDTV), from a set top box to a video display, for example. W-HDTV may require high data rates that may be achieved with large bandwidth communication technologies, for example UWB and/or 60-GHz communications.

In another embodiment of the invention, the local data source 113 may be operable to provide data to be displayed by the receiving device 114A via the host device 110a and the mesh network 120. For example, the local data source may comprise a DVD player or a digital video recorder. The local data source may communicate with the host device 110a via a wired connection or via a wireless connection, either directly with the host device 110a or via the access point 112b.

In an embodiment of the invention, the short range radio 111b and the receiving devices 114A-114D may comprise a plurality of antennas and frequency up-conversion devices throughout the device for communicating high frequency RF signals. Each device may comprise a baseband and/or an IF stage with a single high power PA that may communicate IF signals over thin coaxial lines. Taps may be configured to couple the IF signals from the coaxial lines to the frequency up-conversion devices before being communicated to the plurality of antennas. In this manner, IF signals may be amplified by a single PA and subsequently up-converted to 60 GHz, for example, for transmission via a plurality of antennas without the need for multiple PAs with excessive power requirements.

In an exemplary embodiment of the invention, a plurality of antennas, such as the antennas 120B-120E, may be enabled to communicate signals from the short-range radio 111b to one or more external devices, such as the receiving devices 114A and 114B. The signals may be down-converted and processed in the receiving devices and communicated within the devices via coaxial lines at IF frequencies, and subsequently up-converted to RF before being communicated to the next receiving device. This may reduce the 60 GHz circuitry requirements in the short range radio 111b and the receiving devices 114A-114D, as signals may be communicated in the IF range and only up-converted to high frequency RF at the plurality of remote RF modules in the devices just prior to transmission.

Figure 1B:
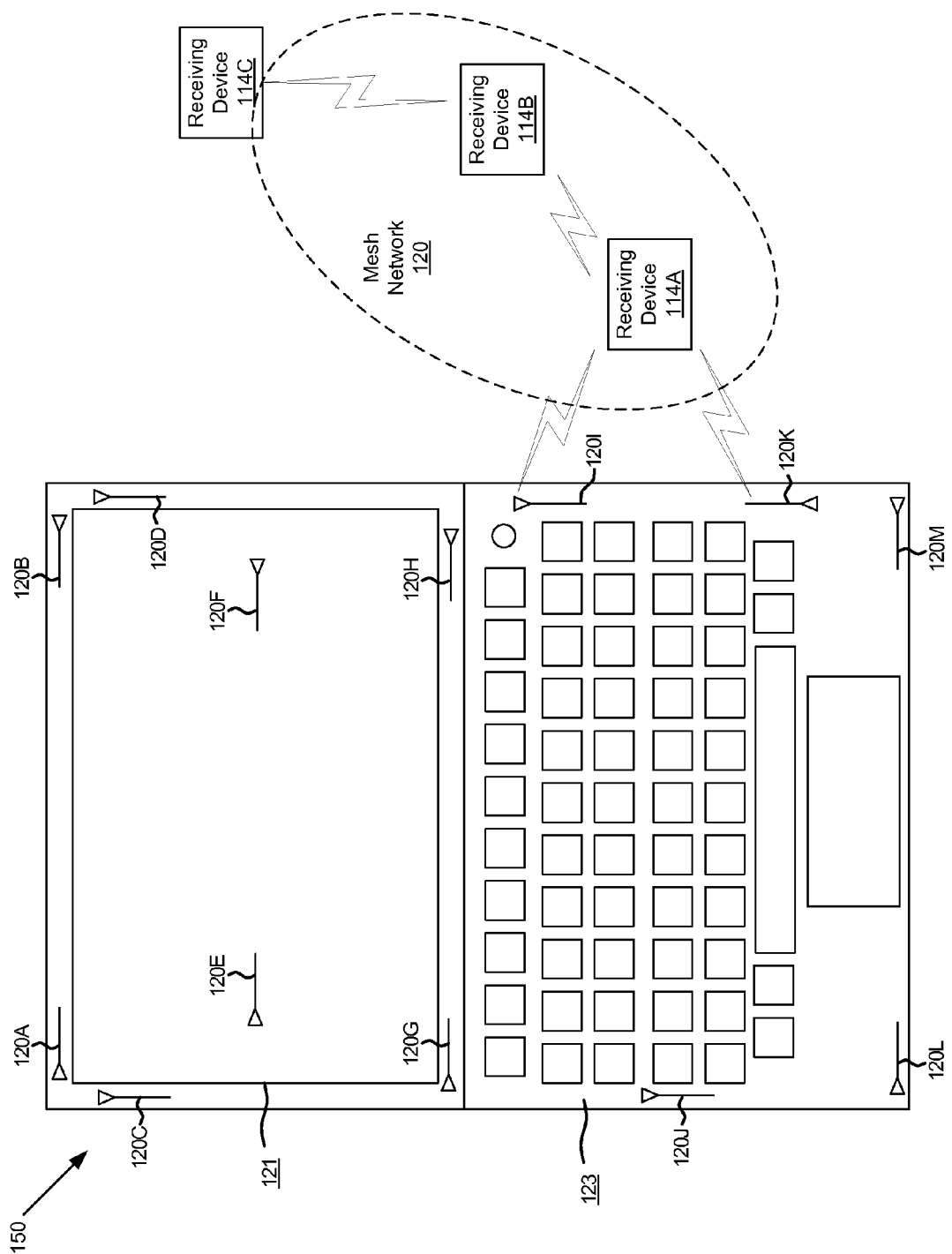
FIG. 1B is a block diagram illustrating a laptop computer with an exemplary 60 GHz mesh network of repeaters, in accordance with an embodiment of the invention.

FIG. 1B is a block diagram illustrating a laptop computer with an exemplary 60 GHz mesh network of repeaters, in accordance with an embodiment of the invention. Referring to FIG. 1B, there is shown a mesh network 120 comprising the receiving devices 114A-114C, and the laptop computer 150 comprising a display 121, keyboard 123, and a plurality of antennas 120A-120M.

The antennas 120A-120M may be substantially similar to the antennas 120A-120E described with respect to FIG. 1A, and may comprise antennas coupled to a plurality of remote RF modules throughout the laptop 150. In this manner, one or more antenna configurations may be enabled, depending on the location of the receiving device, such as the receiving device 114A, and the antenna configuration that results in the greatest signal strength, lowest bit error rate, highest data throughput, lowest latency, and/or the optimum of any other desired wireless communication characteristic.

The antennas 120A-120M may be coupled to remote RF modules throughout the laptop 150. The remote RF modules may receive IF signals from a baseband and IF module via thin coaxial lines, described with respect to FIG. 2, and may be operable to up-convert received IF signals to RF signals. In this manner, lower frequency signals may be communicated throughout the laptop 150 to the antennas that result in desired signal quality. This may enable a single high-power PA stage that amplifies the IF signals that are then up-converted to RF in the remote RF modules. Similarly, the same configuration of remote RF modules and IF signals communicated via coaxial lines may be incorporated in the receiving devices 114A-114C.

The configuration found to have the desired characteristics may be enabled to provide pseudo beamforming by communicating an IF signal to each of the RF modules driving the antennas in that configuration. Exemplary characteristics may comprise carrier to noise ratio (CNR), carrier to interference noise ratio (CINR), signal to noise ratio (SNR), signal to interference noise ratio (SINR), throughput, bit error rate (BER), packet error rate (PER), frame error rate (FER), quality of service (QoS), latency, and/or signal strength.

In operation, a mesh network of repeaters may be enabled between the laptop 150 and the receiving device 114C in instances where the laptop 150 and the receiving device 114C are too far apart for direct line-of-sight communication at high frequency RF, such as 60 GHz, for example. Accordingly, one or more antenna configurations may be assessed in each device for a desired performance characteristic, such as signal strength, bit error rate, data throughput, and/or latency, for example.

The remote RF device and antenna configuration that results in the desired performance, such as the antennas 120I and 120K, for example, may then be enabled to receive IF signals via coaxial lines from a centrally located baseband and IF module, and up-convert the signals to RF before transmitting via the appropriate antennas 120I and 120K to the receiving device 114A. The receiving device 114A may receive the RF signals and process them before communicating them to the next receiving device 114, and similarly to the final receiving device 114C. Any number of repeaters may be utilized in the mesh network.

Figure 2A:
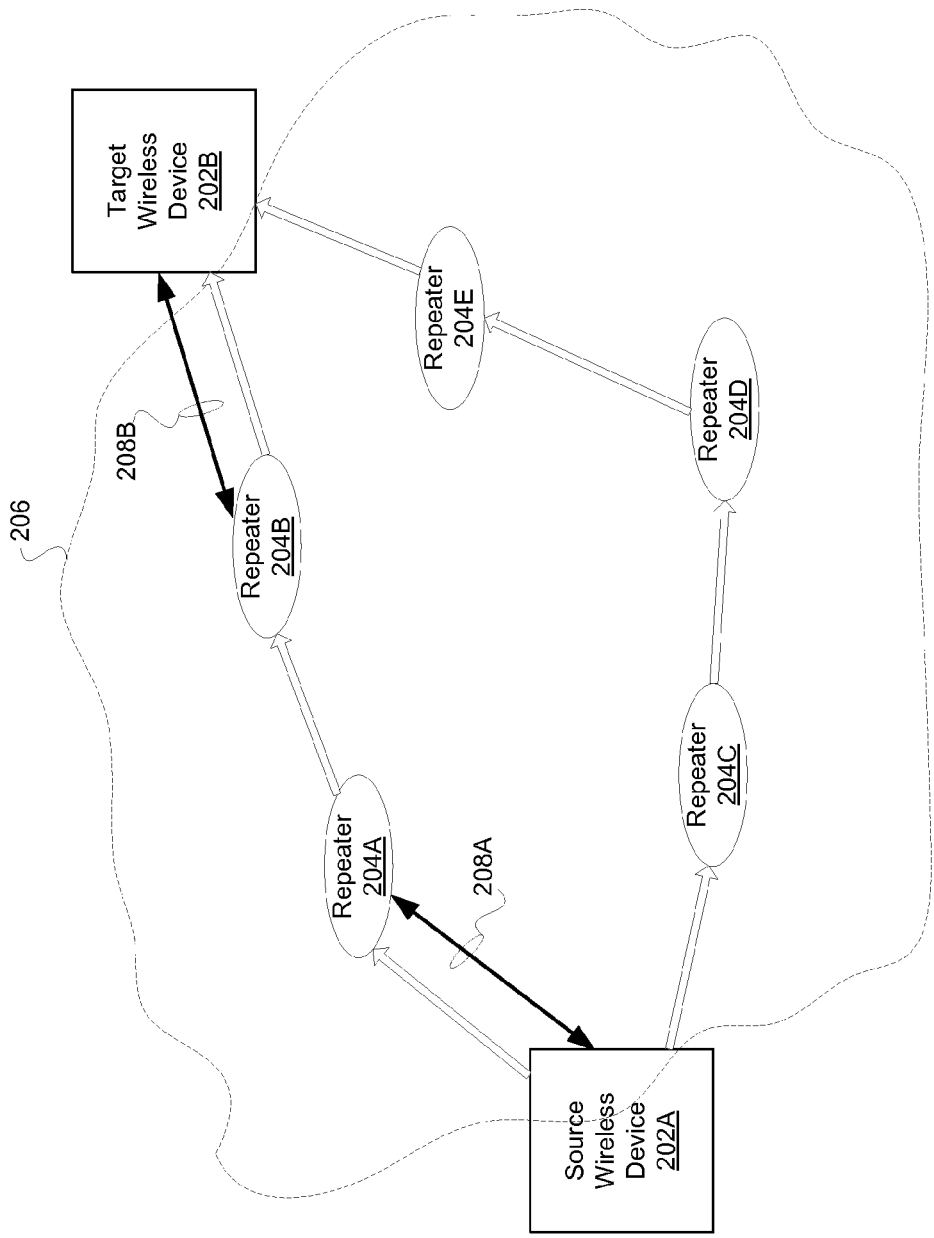
FIG. 2A is a block diagram illustrating an exemplary distributed 60 GHz communication system with a mesh network of repeaters, in accordance with an embodiment of the invention.

FIG. 2A is a block diagram illustrating an exemplary distributed 60 GHz communication system with a mesh network of repeaters, in accordance with an embodiment of the invention. Referring to FIG. 2A, there is shown a source wireless device 202A, a target wireless device 202B, a plurality of repeater devices 204A, 204B, 204C, 204D, and 204E, a repeater mesh network 206, and control connections 208A and 208B.

The source wireless device 202A and the target wireless device 202B may each comprise suitable circuitry, logic, interfaces, and/or code that may be operable to receive, transmit, and process RF signals. The RF signals may comprise 60 GHz signals. The source wireless device 202A and the target wireless device 202B may each be substantially similar to the wireless device 150 described with respect to FIG. 1A.

The plurality of repeater devices 204A, 204B, 204C, 204D, and 204E may comprise suitable circuitry, logic, interfaces, and/or code that may be operable to receive and/or transmit RF signals to facilitate forwarding RF signals between devices. The repeater mesh network 206 may comprise portions of the source wireless device 202A and target wireless device 202B, the plurality of repeater devices 204A, 204B, 204C, 204D, and 204E, and may also comprise suitable circuitry, logic, interfaces, and/or code that may be operable to form mesh-like, ad hoc networks of repeater devices.

The repeater devices 204A-204E may comprise distributed RF modules within, such that IF signals may be communicated via coaxial lines within the repeater devices 204A-204E and up-converted to RF for transmission.

In operation, the plurality of repeater devices 204A, 204B, 204C, 204D, and 204E and portions of the source wireless device 202A and target wireless device 202B may form the repeater mesh network 206. Each of the plurality of repeater devices 204A, 204B, 204C, 204D, and 204E may be enabled to ascertain the presence of other repeater devices in its vicinity. The repeater devices 204A, 204B, 204C, 204D, and 204E may exchange information that may enable them to determine routing paths within the mesh network 206 while transmitting and/or receiving RF signals. Consequently, the repeater mesh network 206 may enable forwarding high frequency RF communication between the source wireless device 202A and the target wireless device 202B.

High frequency RF communication, such as 60 GHz, for example, may generally have limited range, typically operating only under "line-of-sight" conditions. Accordingly, the source wireless device 202A and the target wireless device 202B may not be able to utilize RF communication directly. A single repeater device may be utilized to adequately forward RF communication between the source wireless device 202A and the target wireless device 202B. However, a single repeater device may be limited by the operational limitations of high frequency RF communication while receiving and transmitting 60 GHz RF signals. Therefore, where the separation between the source wireless device 202A and the target wireless device 202B may exceed the effective operational range of a single repeater device, the use of a single repeater device may not be sufficient. Consequently, the plurality of repeater devices 204A, 204B, 204C, 204D, and 204E may be utilized to enable high frequency RF communication between the source wireless device 202A and the target wireless device 202B at distances that may exceed the operational range of a single repeater device. For example, the source wireless device 202A may be enabled to communicate high frequency RF signals to the target wireless device 202B via the repeater mesh network 206, utilizing a route that may comprise the repeater devices 204A and 204B.

In an embodiment of the invention, multiple routes may be utilized in a repeater mesh network simultaneously. For example, where the source wireless device 202A may utilize the repeater mesh network 206 to communicate high frequency RF signals to the target wireless device 202B, two routes may be utilized to perform the RF communication via the repeater mesh network 206. In this regard, a first route may comprise the repeater devices 204A and 204B, and a second route may comprise the repeater devices 204C, 204D, and 204E. Information transmitted via the RF communication between the source wireless device 202A and the target wireless device 202B may be multiplexed onto the multiple routes to enable increasing bandwidth compared to what may have been available by use of a single route. Alternatively, the different routes may be utilized to achieve redundancy, for example, to improve a reliability of RF communication between the source wireless device 202A and the target wireless device 202B. In this regard, each of the multiple routes may be utilized to perform the same RF communication.

To improve the effectiveness of the repeater mesh network 206, different techniques may be utilized, while forming routes within the repeater mesh network 206, to reduce and/or prevent interference that might be caused by RF signals received and/or transmitted by a repeater device to the other repeater devices in the repeater mesh network 206. These techniques may comprise frequency shifting, spatial isolation, and/or polarization isolation. For example, each of the repeater devices 204A-204E may be enabled to utilize frequency shifting to vary characteristics of transmitted RF signals to reduce and/or prevent interference to repeater devices not within a determined route. Additionally, use of beam forming may enable spatial isolation that may reduce and/or prevent interference to repeater devices not within a determined route. Finally, proper polarization settings may be selected to enable transmission of high frequency RF signals by each of the repeater devices 204A-204E that may reduce and/or prevent interference to repeater devices not within a determined route.

The control connections 208A and/or 208B may comprise control signals and may be utilized to enable the source wireless device 202A and/or the target wireless device 202B to utilize the repeater mesh network 206 to forward RF communication. For example, the source wireless device 202A may utilize control connection 208A to determine, via the repeater device 204A, availability of one or more routes that may enable transmitting high frequency RF signals to the target wireless device 202B. Also, the repeater device 204B may utilize the control connection 208B, to coordinate with the target 202B in setting up for RF communication by the source wireless device 202A.

While FIG. 2A depicts a single pair of wireless devices, 202A and 202B, utilizing the repeater mesh network 206, the invention need not be so limited. The repeater mesh network 206 may be enabled to perform concurrent RF communication forwarding operations between multiple pairs of wireless devices at the same time. Additionally, each of the wireless devices 204A-204E, may be utilized to perform concurrent RF communication forwarding operations for different pairs of wireless devices.

Figure 2B:
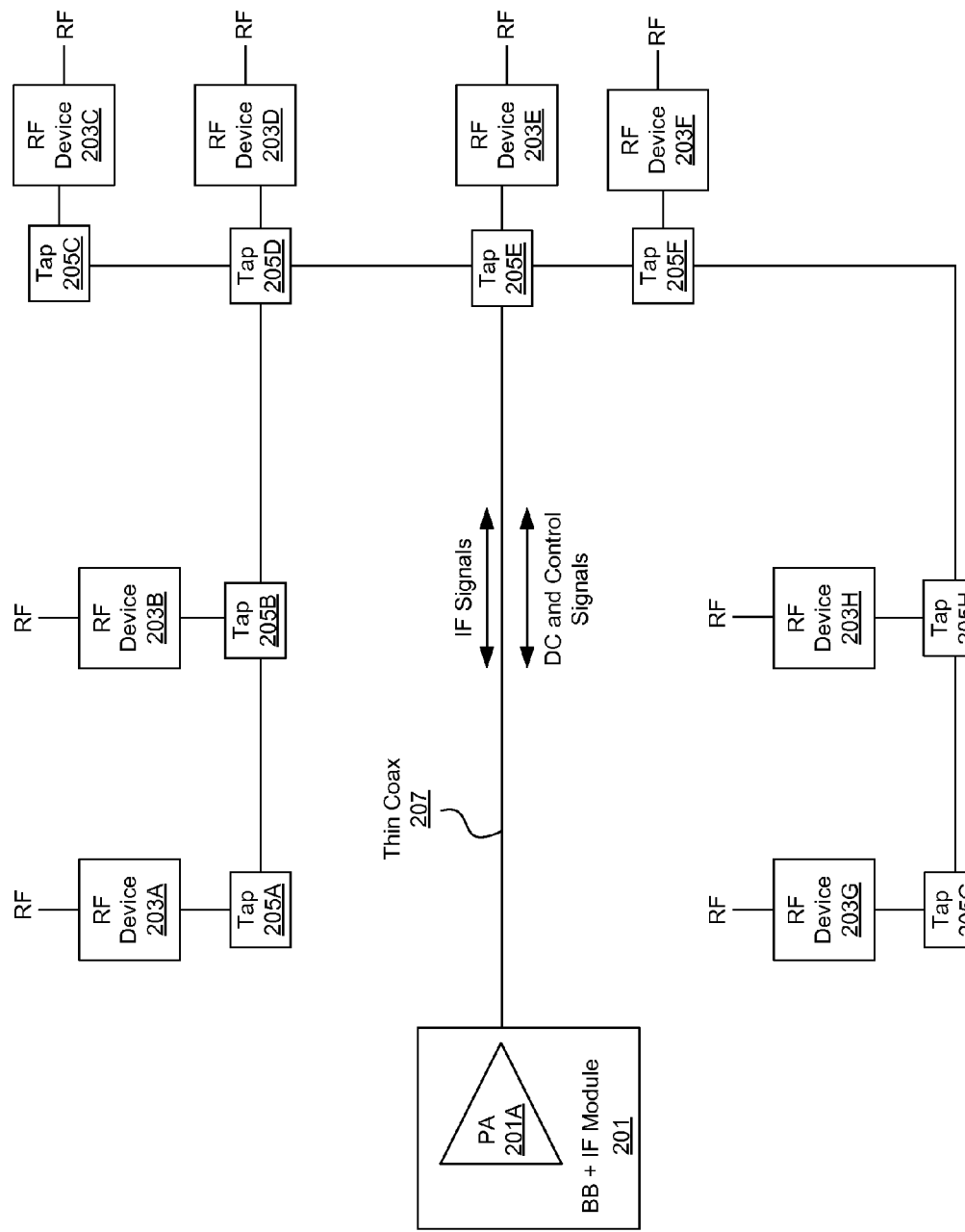
FIG. 2B is a block diagram illustrating an exemplary 60 GHz communication system, in accordance with an embodiment of the invention.

FIG. 2B is a block diagram illustrating a 60 GHz communication system, in accordance with an embodiment of the invention. Referring to FIG. 2B, there is shown a baseband and IF module 201, RF modules 203A-203H, taps 205A-205H, and thin coaxial line 207.

The baseband and IF module 201 may comprise suitable circuitry, logic, interfaces, and/or code that may be operable to generate IF signals comprising baseband data. The baseband and IF module 201 may comprise one or more processors, such as a baseband processor, memory, and frequency conversion devices, for example. The processor or processors in the baseband and IF module 201 may be any suitable processor or controller such as a CPU, DSP, ARM, or any type of integrated circuit processor, and may be enabled to update and/or modify programmable parameters and/or values in a plurality of components, devices, and/or processing elements in the baseband and IF module 201. At least a portion of the programmable parameters may be stored in memory, such as the host memory 111d, for example, or dedicated memory in the baseband and IF module 201.

The RF modules 203A-203H may comprise suitable circuitry, logic, interfaces, and/or code that may be operable to convert received IF signals to RF frequencies and transmit the RF signals via one or more antennas. The RF modules 203A-203H may be configured remotely throughout a wireless communication device, such as the host device 110a, described with respect to FIG. 1, so that 60 GHz signals may be communicated from a plurality of directions, depending on the location of a device that is the intended receiving device. By incorporating frequency up-conversion capability in the RF modules 203A-203H, IF signals may be communicated from a single high power PA in the baseband and IF module 201 via the thin coaxial line 207.

The taps 205A-205H may comprise suitable circuitry, logic, interfaces, and/or code that may be operable to couple a portion of the IF signal being communicated via the thin coaxial line 207 to the associated RF modules 203A-203H. In this manner, taps may be configured to couple signals when it may be desired to transmit RF signals via one or more of the RF modules 203A-203H.

The thin coaxial line 207 may comprise coaxial conductors separated by a dielectric material, for example, and may be operable to communicate IF signals throughout a device, such as the host device 110a. In another embodiment of the invention, the thin coaxial line 207 may be operable to provide DC power for various devices within the host device 110a, such as the RF modules 203A-203H.

In operation, the baseband and IF module 201 may process baseband signals for transmission via the RF modules 203A-203H. The baseband signals may be up-converted to IF and amplified by a PA prior to communication via the thin coaxial line 207, which may distribute the IF signals throughout the device, such as the host device 110a, for example. One or more of the taps 205A-205H may be enabled to tap a portion of the communicated IF signals to associated RF modules 203A-203H. The RF modules 203A-203H may up-convert the tapped IF signals to RF frequencies, such as 60 GHz, for example, before transmission via one or more antennas in the RF modules 203A-203H. In this manner, an RF power amplifier is not required at each RF device 203A-203H, which would require more power than by utilizing a single PA 201A at the IF stage in the baseband and IF module 201.

In addition to IF signals to be up-converted and transmitted, the thin coaxial line 207 may communicate low frequency control signals to the RF modules 203A-203H and the taps 205A-205H. The control signals may be utilized to configure which of the taps 205A-205H may be activated to tap off part of the IF signals for transmission by the appropriate RF device 202A-203H. In addition, the control signals may be utilized to configure the up-conversion performed in the RF modules 203A-203H. In this manner, only those RF modules 203A-203H that have antennas in an appropriate direction for a desired receiving device may be activated, further reducing power requirements.

In an exemplary embodiment of the invention, the RF modules 203A-203H may be enabled individually to determine an RSSI for communication between the host device 110a and one or more external devices, such as the receiving devices 114A-114D. One or more antennas in the RF modules 203A-203H may be enabled sequentially, or in any desired order, to determine an antenna configuration that results in the maximum received signal strength, for example. The configuration parameters may be communicated utilizing control channels communicated over the thin coaxial line 207, and the measured signal parameters may be communicated back to the baseband and IF module 201 via the same coaxial line. The control channels may reside at different frequencies than the IF signals to enable multi-signal communication over the thin coaxial line 207.

The signal integrity may be assessed periodically to determine if one or more other RF modules 203A-203H may be capable of communicating signals with better signal strength or bit error rate, for example, where either communicating device has moved. The RF modules 205A-205H and associated antennas may be configured by control signals communicated over the thin coaxial line 207. The control signals may be at a different frequency than the IF signals communicated via the RF device 203A-203F. The control signals may also be utilized to configure a mesh network with external devices, such as the receiving devices 114A-114D. In this manner, the RF signals transmitted by the enabled RF modules 203A-203H may be communicated via a mesh network to one or more devices outside the immediate short-range communication area, such as line-of-sight communication at 60 GHz frequencies, for example.

Figure 3:
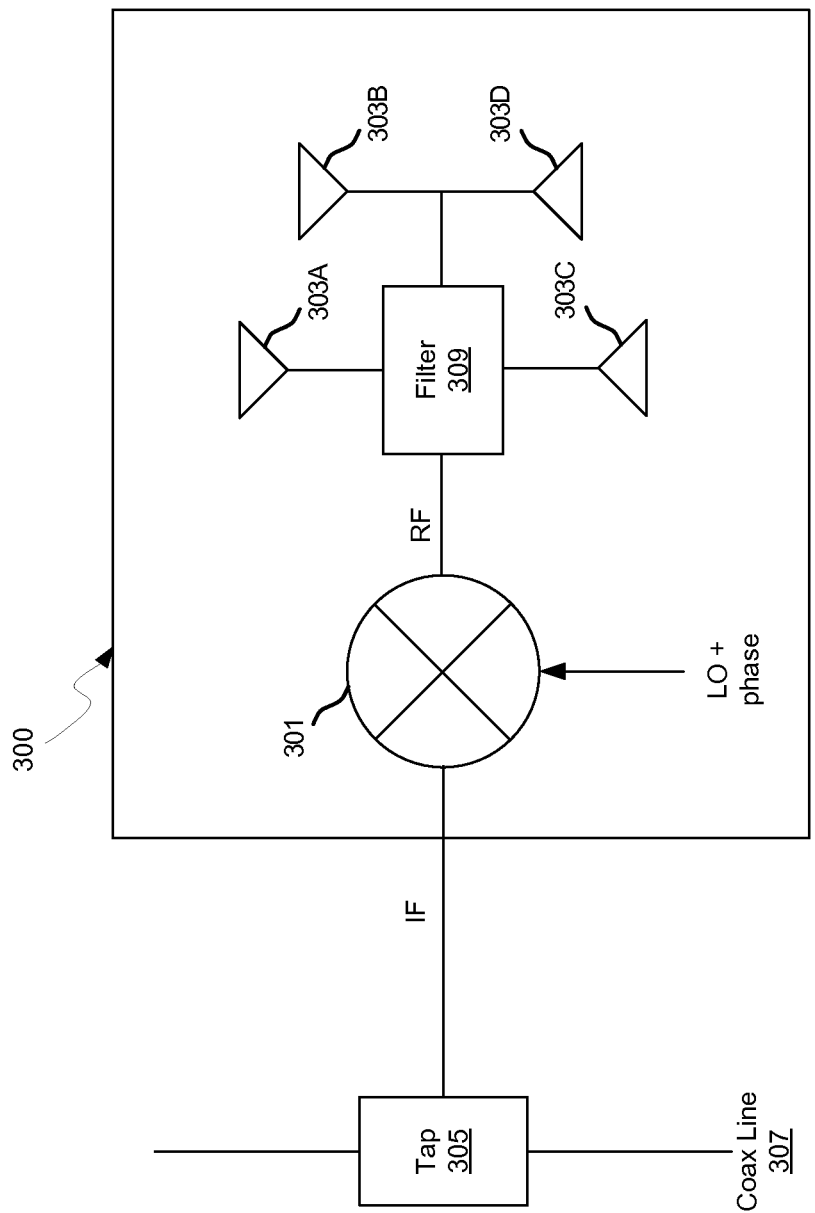
FIG. 3 is a block diagram illustrating an exemplary RF module, in accordance with an embodiment of the invention.

FIG. 3 is a block diagram illustrating an exemplary RF module, in accordance with an embodiment of the invention. Referring to FIG. 3, there is shown a tap 305, a coaxial line 307 and an RF module 300 comprising a mixer 301, antennas 303A-303D, and a filter 309. The antennas 303A-303D may comprise antennas operable to transmit and/or receive RF signals, and may be configured with different orientations, for example. The tap 305 and the coaxial line 307 may be substantially similar to the taps 205A-205H and the coaxial line 207 described with respect to FIG. 2.

The mixer 301 may comprise suitable circuitry, logic, interfaces, and/or code that may be operable to frequency shift a received input signal. For example, the mixer 301 may receive an IF input signal and generate an RF output signal. The mixer 301 may also receive as an input signal, an LO signal that may be utilized to up-convert the received IF signal to RF frequencies.

The antennas 303A-303D may be substantially similar to the antennas 120A-120M described with respect to FIG. 1B, and may be operable to communicate RF signals between the host device 110a, or the laptop 150, and one or more external devices, such as the receiving devices 114A-114D. The antennas 303A-303D may enable communication via a mesh network of repeaters.

The filter 309 may comprise suitable circuitry, logic, interfaces, and/or code that may be operable to pass signals at a desired frequency range, while attenuating those that are outside of the desired frequency range. The filter may comprise a bandpass filter, lowpass, or a highpass filter, for example. Accordingly, if up-converting to RF, and sum and difference signals are generated by the mixer 301 based on the LO signal and received IF signal, the filter 309 may allow only the high frequency RF signal to pass to the antenna 303, thereby acting as a highpass filter.

In operation, control signals in the coaxial line 307 may configure the tap 305 to tap off a portion of an IF signal communicated via the coaxial line 307 and communicate it to the mixer 301. The LO signal may be utilized to up-convert the IF signal to RF frequencies, and the filter 309 may filter out all but the desired signal at a frequency above a configurable corner frequency of the filter 309. The control signals may also configure a mesh network of repeaters for communicating the generated RF signals over a farther distance than possible to a single receiving device. The repeaters may also comprise a plurality of RF modules for communicating RF signals, with IF signals communicated within the repeater devices via coaxial lines.

The filtered RF signal may then be communicated to one or more of the antennas 303A-303D. A desired signal characteristic, such as RSSI or BER, for example, may be utilized to assess the signal received in a plurality of antenna configurations. This may be repeated for each of the antennas 303A-303D as well as for each RF device. In this manner, if one or more of the antennas 303A-303D results in the best signal, that configuration may then be used to communicate RF signals with desired receiving devices.

Figure 4:
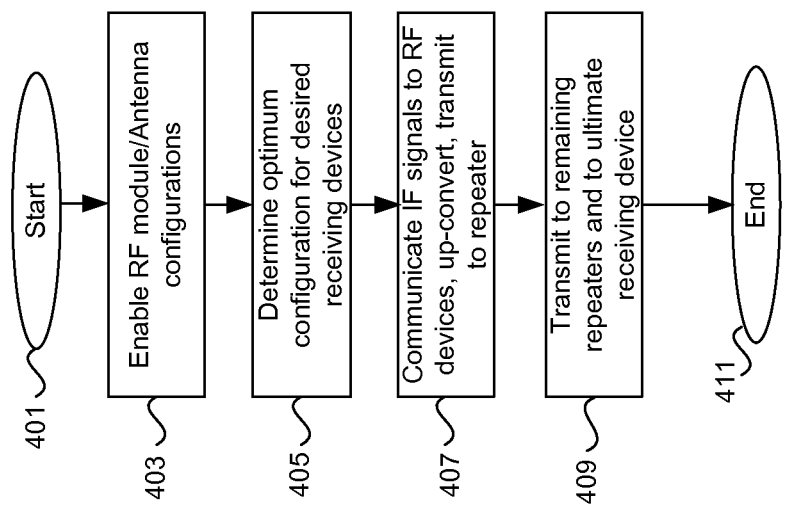
FIG. 4 is a block diagram illustrating exemplary steps in a 60 GHz distributed communication system utilizing a mesh network of repeaters, in accordance with an embodiment of the invention.

FIG. 4 is a block diagram illustrating exemplary steps in a 60 GHz distributed communication system utilizing a mesh network of repeaters, in accordance with an embodiment of the invention. Referring to FIG. 4, after start step 401, in step 403, RF modules and antennas may be enabled. In step 405, the optimum configuration or configurations may be determined for the desired receiving device or devices. The optimum beamforming configuration may be determined based on, for example, CNR, CINR, SN, SINR, throughput, BER, PER, FER, QoS, latency, and/or signal strength. In step 407, baseband signals may be up-converted to IF, communicated to one or more RF modules where they may be up-converted to RF before being transmitted to one or more external receiving devices. In step 409, the RF signals may communicated to other repeater devices until the final destination receiving device receives the RF signals. The exemplary steps may end at step 411.

In an embodiment of the invention, a method and system may comprise configuring a plurality of antennas 120A-120M, 303A-303D in the plurality of remote RF modules 203A-203H, 300 for communicating RF signals, wherein each of the plurality of remote RF modules 203A-203H, 300 may receive IF signals via one or more coaxial lines. The RF signals may be transmitted via the plurality of antennas 120A-120M, 303A-303D to a destination device via a mesh network 120, 206, wherein the mesh network comprises the plurality of remote RF modules and one or more repeaters 114A-114C, 204A-204D external to the wireless communication device 110a, 150. The IF signals in the one or more coaxial lines 207, 307 may be tapped at taps coupled to the plurality of remote RF modules 203A-203H, 300. The repeaters 114A-114C, 204A-204D in the mesh network 120, 206 may be configured via the wireless communication device 110a, 150. The plurality of remote RF modules 203A-203H, 300 may be configured utilizing a processor in the wireless communication device 110a, 150, where the control signals for the configuring of the plurality of remote RF modules 203A-203H, 300 may be communicated via the one or more coaxial lines 207, 307. The mesh network 120, 206 may be configured utilizing a processor 111c in the wireless communication device 110a, 150. The control signals for the configuring of the mesh network 120, 206 may be communicated to one or more of the plurality of RF modules 203A-203H, 300 via the one or more coaxial lines 207, 307. The RF signals may be generated from IF signals from one or more baseband signals that may comprise one or more of video data, streamed Internet data, or data from a local data source. The RF signals may comprise 60 GHz signals.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for 60 GHz distributed communication utilizing a mesh network of repeaters.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for wireless communication, the method comprising:
    in a wireless communication device comprising a body and a plurality of remote radio frequency (RF) modules distributed within said body of said wireless communication device and interconnected via at least one coaxial line that also conveys control signals on a frequency different than amplified intermediate frequency (IF) signals:
    configuring a plurality of antennas in said plurality of remote RF modules for communicating RF signals, wherein each of said plurality of remote RF modules receive the amplified IF signals that were amplified in a final power amplification stage via the one or more coaxial lines within said body of said wireless communication device; and
    transmitting said RF signals, via said plurality of antennas, to a destination device via a mesh network, wherein said mesh network comprises said plurality of remote RF modules and one or more repeaters that are external to said wireless communication device.

2. The method according to claim 1, comprising tapping said amplified IF signals in said one or more coaxial lines at taps coupled to said plurality of remote RF modules.

3. The method according to claim 1, comprising configuring said repeaters in said mesh network via said wireless communication device.

4. The method according to claim 1, comprising configuring said plurality of remote RF modules utilizing a processor in said wireless communication device.

5. The method according to claim 4, comprising communicating control signals for said configuring of said plurality of remote RF modules via said one or more coaxial lines.

6. The method according to claim 1, comprising configuring said mesh network utilizing a processor in said wireless communication device.

7. The method according to claim 2, comprising communicating said control signals for said configuring of said mesh network to one or more of said plurality of RF modules via said one or more coaxial lines.

8. The method according to claim 1, comprising generating said RF signals from the amplified IF signals from one or more baseband signals.

9. The method according to claim 8, wherein said one or more baseband signals comprise one or more of video data, streamed Internet data, or data from a local data source.

10. The method according to claim 1, wherein said RF signals comprise 60 GHz signals.

11. A system for wireless communication, the system comprising:
one or more circuits in a body of a wireless communication, said one or more circuits being configured to:
configure a plurality of antennas in a plurality of remote radio frequency (RF) modules distributed within said body of said wireless communication device and interconnected by at least one coaxial line that also conveys control signals on a frequency different than amplified intermediate frequency (IF) signals, the plurality of remote radio RF modules being configured to communicate RF signals, wherein each of said plurality of remote RF modules receive the amplified IF signals that were amplified in a final power amplification stage via the one or more coaxial lines within said body of said wireless communication device; and
transmit said RF signals, via said plurality of antennas, to a destination device via a mesh network, wherein said mesh network comprises said plurality of remote RF modules and one or more repeaters that are external to said wireless communication device.

12. The system according to claim 11, wherein said one or more circuits are operable to tap said amplified IF signals in said one or more coaxial lines at taps coupled to said plurality of remote RF modules.

13. The system according to claim 11, wherein said one or more circuits are operable to configure said repeaters in said mesh network via said wireless communication device.

14. The system according to claim 11, wherein said one or more circuits are operable to configure said plurality of remote RF modules utilizing a processor in said wireless communication device.

15. The system according to claim 14, wherein said one or more circuits are operable to communicate control signals for said configuring of said plurality of remote RF modules via said one or more coaxial lines.

16. The system according to claim 11, wherein said one or more circuits are operable to configure said mesh network utilizing a processor in said wireless communication device.

17. The system according to claim 15, wherein said one or more circuits are operable to communicate said control signals for said configuring of said mesh network to one or more of said plurality of RF modules via said one or more coaxial lines.

18. The system according to claim 11, wherein said one or more circuits are operable to generate said RF signals from the amplified IF signals from one or more baseband signals.

19. The system according to claim 18, wherein said one or more baseband signals comprise one or more of video data, streamed Internet data, or data from a local data source.

20. The system according to claim 11, wherein said RF signals comprise 60 GHz signals.

* * * * *